(12) United States Patent
Oudrhiri et al.

(10) Patent No.: US 11,183,871 B2
(45) Date of Patent: Nov. 23, 2021

(54) TECHNOLOGIES FOR STATIC TRANSFER SWITCH LOAD TRANSFER FOR CATCHER UNINTERRUPTIBLE POWER SUPPLY SYSTEMS

(71) Applicant: ABB Schweiz AG, Baden (CH)

(72) Inventors: Adil Oudrhiri, Richmond, VA (US); Christopher Alan Belcastro, Mechanicsville, VA (US)

(73) Assignee: ABB SCHWEIZ AG, Baden (CH)

( * ) Notice: Subject to any disclaimer, the term of this patent is extended or adjusted under 35 U.S.C. 154(b) by 263 days.

(21) Appl. No.: 16/258,825

(22) Filed: Jan. 28, 2019

(65) Prior Publication Data

US 2020/0244097 A1 Jul. 30, 2020

(51) Int. Cl.
*H02J 9/06* (2006.01)
*H02J 3/14* (2006.01)
*G06F 1/30* (2006.01)
*G06F 1/26* (2006.01)

(52) U.S. Cl.
CPC ............... *H02J 9/068* (2020.01); *H02J 3/14* (2013.01); *H02J 9/06* (2013.01); *G06F 1/263* (2013.01); *G06F 1/30* (2013.01)

(58) Field of Classification Search
CPC .... H02J 9/06; H02J 3/14; G06F 1/263; G06F 1/30–305
See application file for complete search history.

(56) References Cited

U.S. PATENT DOCUMENTS 5,210,685 A 5/1993 Rosa
5,465,011 A 11/1995 Miller et al.
6,433,444 B1 * 8/2002 de Vries ............... H02J 1/10
307/64
10,175,737 B1 * 1/2019 Kong .................. G01R 21/133
10,348,124 B1 * 7/2019 MacGregor ............... G06F 1/28
10,468,909 B2 * 11/2019 Navarro ................. H02M 3/04
2013/0069432 A1 3/2013 Beg et al.
(Continued)

FOREIGN PATENT DOCUMENTS

JP 2008312371 A 12/2008
WO 2016/099938 A1 6/2016

OTHER PUBLICATIONS

International Search Report for PCT/US2020/015324, dated Apr. 23, 2020, 3 pages.
(Continued)

*Primary Examiner* — Hal Kaplan
*Assistant Examiner* — David A Shiao
(74) *Attorney, Agent, or Firm* — Armstrong Teasdale LLP

(57) ABSTRACT

Technologies for transferring a load by a static transfer switch (STS) to a catcher uninterruptible power supply (UPS) are disclosed. In an illustrative embodiment, each STS in a catcher UPS system monitors an available power of the catcher UPS. The STS determines, in response to a power failure event of an associated UPS, whether a real-time power supplied to a load connected to the STS exceeds the available power of the catcher UPS and whether the STS has priority over each other STS in the system. The STS transfers the load from the associated UPS to the catcher UPS in response to determining that the real-time power supplied to the load does not exceed the available power of the catcher UPS and that the STS has priority over each other STS in the system.

18 Claims, 5 Drawing Sheets

(56) References Cited

U.S. PATENT DOCUMENTS

2013/0080793 A1    3/2013  Familiant et al.
2016/0181861 A1*   6/2016  Familiant ................ H02J 9/062
                                                        307/66
2017/0040837 A1*   2/2017  Eason ....................... G06F 1/30
2019/0393720 A1*  12/2019  Colombi ................. H02J 9/062

OTHER PUBLICATIONS

Written Opinion for PCT/US2020/015324, dated Apr. 12, 2020, 5 pages.

* cited by examiner

300

| ID | POWER VALUE |
|---|---|
| 1 | $P_1$ |
| 2 | $P_2$ |
| ⋮ | ⋮ |
| N-1 | $P_{N-1}$ |

FIG. 3

TECHNOLOGIES FOR STATIC TRANSFER SWITCH LOAD TRANSFER FOR CATCHER UNINTERRUPTIBLE POWER SUPPLY SYSTEMS

TECHNICAL FIELD

The present disclosure relates, generally, to catcher uninterruptible power supply systems and, more particularly, to technologies for static transfer switch load transfer for catcher uninterruptible power supply systems.

BACKGROUND

An uninterruptible power supply (UPS) provides emergency power to a load during a power failure event, such as when an input power source fails. Power systems may include a UPS to ensure that power is continuously supplied to one or more critical loads. Indeed, a UPS may be deployed in a variety of applications, such as in utility substations, industrial plants, data centers, marine systems, and the like.

Further, some configurations for a UPS system provide redundancy, such that if one UPS fails, another UPS may provide emergency power in its place. An example configuration is a catcher UPS system. A catcher UPS system is a distributed redundant configuration in which a designated UPS is connected to a power system to "catch" a load from another UPS in the event of failure of that other UPS. To do so, the catcher UPS system provides one or more static transfer switches (STSs). When a given UPS fails, an associated STS transfers the load from that UPS to the catcher UPS. Advantageously, the catcher UPS system is relatively less expensive to other UPS approaches that provide redundancy, such as an N+1 UPS configuration.

However, one concern with the catcher UPS system involves an instance in which multiple STSs can potentially overload the catcher UPS (e.g., in the event of failure in multiple UPSs). Current approaches to addressing this concern include implementing programmable logic controllers that allow manual lock out of a given STS to prevent the STS from transferring load. However, such an approach may be difficult to sustain in different failure modes.

SUMMARY

One embodiment presented herein discloses a system. The system includes a plurality of uninterruptible power supplies (UPSs), a catcher UPS, and a plurality of static transfer switches (STSs), in which each STS is connected with an associated UPS and with the catcher UPS. Each STS includes control unit. The control unit is generally to monitor an available power of the catcher UPS. The control unit in each STS is also generally to determine, in response to a power failure event of the associated UPS, whether a real-time power supplied to a load connected to the STS exceeds the available power of the catcher UPS and whether the STS has priority over each other STS. The control unit is also generally to transfer the load from the associated UPS to the catcher UPS in response to determined that the real-time power supplied to the load does not exceed the available power of the catcher UPS and that the STS has priority over each other STS.

Another embodiment presented herein discloses a method. The method generally includes monitoring, via a static transfer switch (STS) of a plurality of STSs, an available power of a catcher uninterruptible power supply (UPS), wherein each STS is connected with an associated one of a plurality of UPSs and with the catcher UPS. The method also generally includes determining, in response a power failure event of the associated UPS, (i) whether a real-time power supplied to a load connected to the STS exceeds the available power of the catcher UPS, and (ii) whether the STS has priority over each other STS of the plurality of STSs. The method also generally includes transferring the load from the associated UPS to the catcher UPS in response to determining that (i) the real-time power supplied to the load does not exceed the available power of the catcher UPS, and (ii) the STS has priority over each other STS of the plurality of STSs.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 3 is a simplified conceptual diagram of at least one embodiment of a resource power table that may be maintained by each STS of FIG. 1;

DETAILED DESCRIPTION OF THE DRAWINGS

Figure 1:
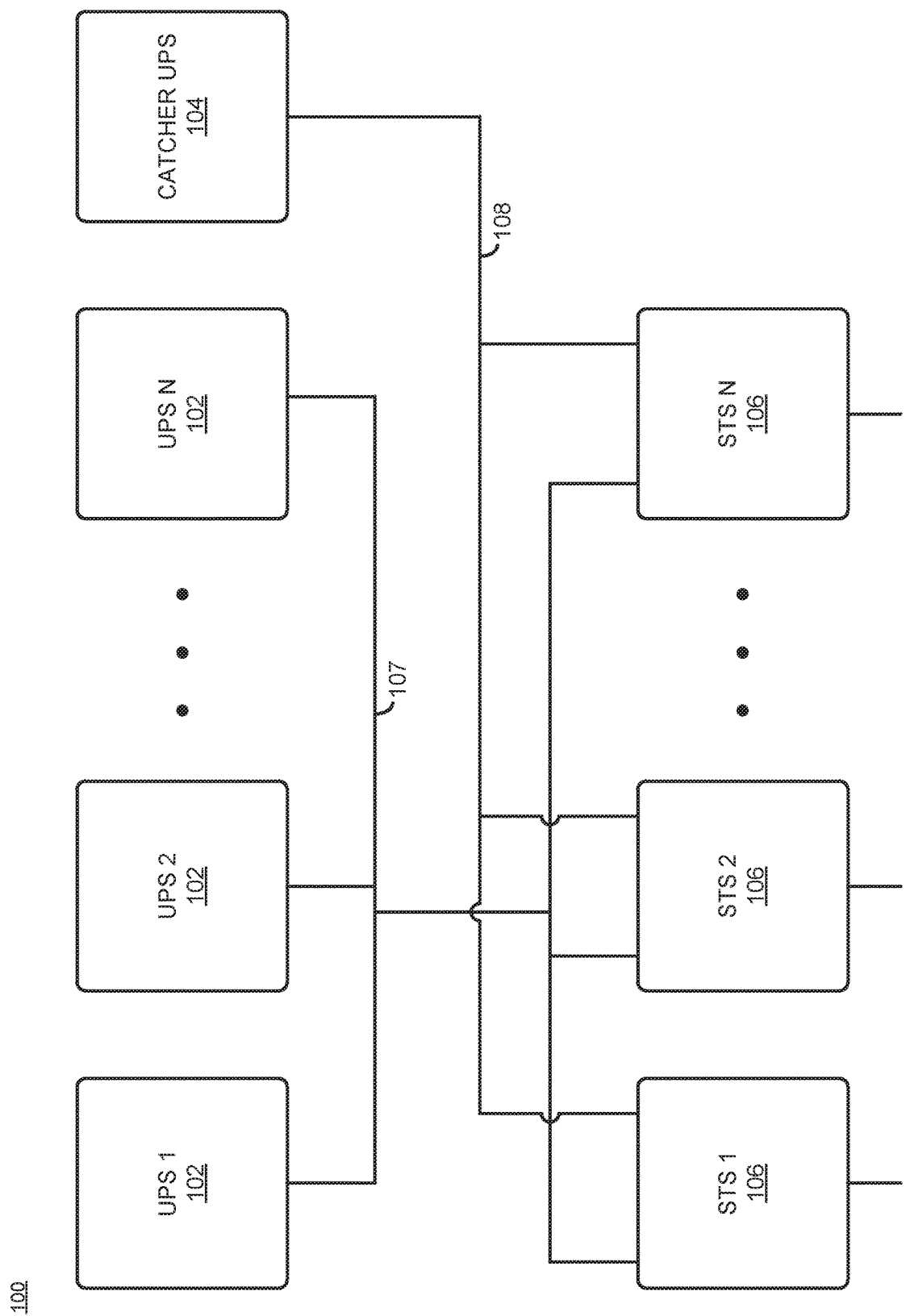
FIG. 1 is a simplified block diagram of at least one embodiment of a system providing a catcher uninterruptible power supply (UPS) architecture.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C).

Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments presented herein disclose techniques for transferring, by a static transfer switch (STS), a load from a given uninterruptible power supply (UPS) to a catcher (UPS) to prevent instances in which loads transferred by multiple STSs overload the catcher UPS. As further described herein, each STS is connected with one another via a communications link and broadcasts, via the communications link, real-time power data associated with the STS. In the event of a power failure event in a UPS coupled with a given UPS, the STS evaluates various characteristics based on the real-time power data of other STSs and an available power of the catcher UPS to determine whether to transfer a load to the catcher UPS. Characteristics can include a priority of the STS relative to other STS (e.g., whether the real-time power supplied to the STS is greater than that of the real-time power supplied to other STSs). Advantageously, embodiments disclosed herein allow power systems configured for a catcher UPS architecture to preserve and maximize an amount of power transferred to the catcher UPS without causing overload to the catcher UPS. Embodiments disclose an automated approach that can be configured with relative ease by an installer or user.

Referring now to FIG. 1, a system 100 for transferring a load to a catcher uninterruptible power supply includes UPSs 1-N 102, a catcher UPS 104, and one or more STSs 1-N 106. The illustrative system 100 may be representative of a catcher UPS architecture, such as a data center power system architecture in which a catcher UPS feeds an internal automatic bypass of primary UPS systems. Of course, the system 100 disclosed herein may be adapted to a variety of settings, such as an industrial plant, utility substation, high security system, telecommunications center, and so on. The system 100 may include additional, fewer, or alternative components, including those described elsewhere herein. Under normal operation, one or more utilities may function as a voltage source and provide alternating current (AC) power to one or more loads.

The UPSs 1-N 102 and the catcher UPS 104 may be embodied as any type of UPS or other device capable of supplying emergency power to a given load in response to a power failure event (e.g., a brown out, excessive voltage, excessive current, reduced power quality, and the like). In the event of a failure of a source, a given UPS 102 may use energy storage systems (e.g., batteries, flywheels, etc. with a converter) to maintain power flow to the loads. Further, if a given UPS 102 fails, the loads are fed power via the catcher UPS 104. In some embodiments, each UPS 1-N 102 may provide auxiliary power to a given load to maintain a continuous and predetermined quality of power. Further, by including multiple UPSs 1-N 102 in the system 100, the UPSs 1-N provide a redundant power source.

The STSs 1-N 106 may be embodied as any type of STS or other device capable of transferring electric loads between two independent power sources. Illustratively, each STS 1-N 106 is connected with an associated UPS 1-N 102 and the catcher UPS 104. Particularly, the UPS 1-N 102 is connected with the UPS 1-N 102 at a primary power source line 107, and the catcher UPS 104 is connected with the STS 1-N 106 at an alternate power source line 108. During normal operation of the system 100 (e.g., in the absence of a power failure event), the STSs 1-N 106 are open at the line 107. During power failure event of an associated UPS 102, the corresponding STS 1-N 106 is closed at the line 107 and open at the line 108. Each STS 1-N 106 in the system 100 may have an identical power tolerance to one another.

As stated, in the event of a power failure event in the UPS 102, the loads are fed power via the catcher UPS 104. To do so, a given STS 1-N 106 is coupled between an associated UPS 102 and the catcher UPS 104, enabling the STS 106 to perform instantaneous switching operations of the load from the associated UPS 102 to the catcher UPS 104. Using an STS 1-N 106 enables relatively fast reaction times to a detected power failure event (e.g., in comparison to circuit breakers and other switching devices).

The catcher UPS 104 has an available power that can accommodate a load from one or more of the STSs 106. However, a concern is that the catcher UPS 104 can potentially be overloaded if multiple STSs 106 transfer a load to the catcher UPS 104. As further described herein, each STS 1-N 106 may include control logic for enforcing loads to be transferred to the catcher UPS 104 to avoid an overload of the catcher UPS 104.

Figure 2:
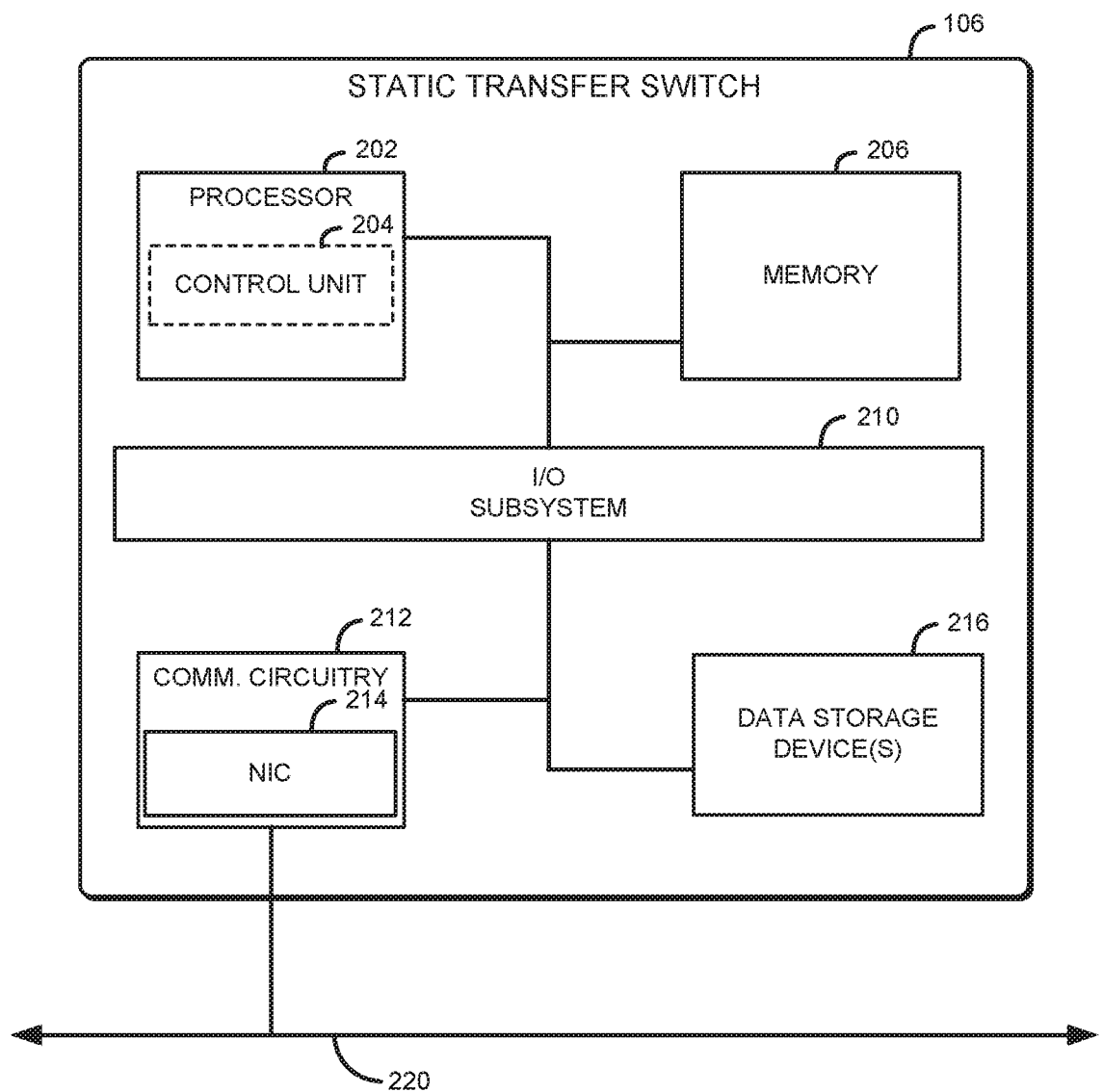
FIG. 2 is a simplified block diagram of at least one embodiment of one of the static transfer switches (STSs) of FIG. 1.

Referring now to FIG. 2, each STS 106 of FIG. 1 may include a processor 202, a memory 206, an I/O subsystem 210, a communication circuitry 212, and one or more data storage device(s) 216. Of course, the STS 106 may include other or additional components, such as those commonly found in a STS (e.g., a breaker system, rectifiers, a programmable logic controller, current sensors, voltage sensors, network ports, and the like), in other embodiments. Additionally, in some embodiments, one or more of the illustrative components may be incorporated in, or otherwise form a portion of, another component. For example, the memory 206, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a microcontroller, or other processor or processing/controlling circuit. Similarly, the memory 206 may be embodied as any type of volatile or non-volatile memory or data storage capable of performing the functions described herein. In operation, the memory 206 may store various data used during operation of the STS 106 such as logic and drivers.

As further described herein, the memory 206 may store a data table used to maintain real-time power values of STSs 106 in the system 100. The memory 206 is communicatively coupled to the processor 202 via the I/O subsystem 210, which may be embodied as circuitry and/or components to facilitate input/output operations with the processor 202, the memory 206, and other components of the static transfer switch. For example, the I/O subsystem 210 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 210 may form a portion of a system-on-a-chip (SoC) and be incorporated, along with the processor 202, the memory 206, and other components of the STS 106, on a single integrated circuit chip.

Illustratively, the processor 202 includes a control unit 204, which may be embodied as any device, software, circuitry, or combination thereof, capable of performing the functions described herein, including monitoring an available power of the catcher UPS 104, detecting a power failure event, determining whether a real-time power supplied to a load connected to the STS 106 exceeds the available power of the catcher UPS 104, determining whether the STS 106 has priority over each other STS 106, and transfer the load from an associated UPS 102 to a catcher UPS 104. The control unit 203 may also include additional control and metering logic used to detect power failure events and switch between power sources (e.g., between an associated UPS 102 and the catcher 104).

The communication circuitry 212 may be embodied as any communication circuit, device, or collection thereof, capable of enabling communications between the STS 106 and other STSs 106 in the system 100, as well as other networked devices. To do so, the communication circuitry 212 may be configured to use any one or more communication technology and associated protocols (e.g., Ethernet, Bluetooth®, Wi-Fi®, WiMAX, etc.) to effect such communication, including wired and/or wireless communication technology and associated protocols.

The communication circuitry 212 may also include a network interface controller (NIC) 214. The NIC 214 may be embodied as one or more add-in-boards, daughter cards, network interface cards, controller chips, chipsets, or other devices that may be used by the STS 106 to connect with another STS 106. In some embodiments, the NIC 214 may be embodied as part of a system-on-a-chip (SoC) that includes one or more processors, or included on a multichip package that also contains one or more processors.

The data storage device 216 may be embodied as any type of device or devices configured for the short-term or long-term storage of data. For example, the data storage device 216 may include any one or more memory devices and circuits, memory cards, hard disk drives, solid-state drives, or other data storage devices. In an embodiment, the data storage device 216 may store a table maintaining real-time power values supplied by other STSs 106.

In addition, as shown, the STS 106 may be communicatively coupled with other STSs 106 in the system 100 via a communication link 220. The communication link 220 may be embodied as any link that enables a given STS 106 to broadcast data regarding internal characteristics of the STS 106 and other information, such as a one wire two ends link providing digital signal processing (DSP) or multicontroller unit (MCU) communication techniques.

Figure 3:
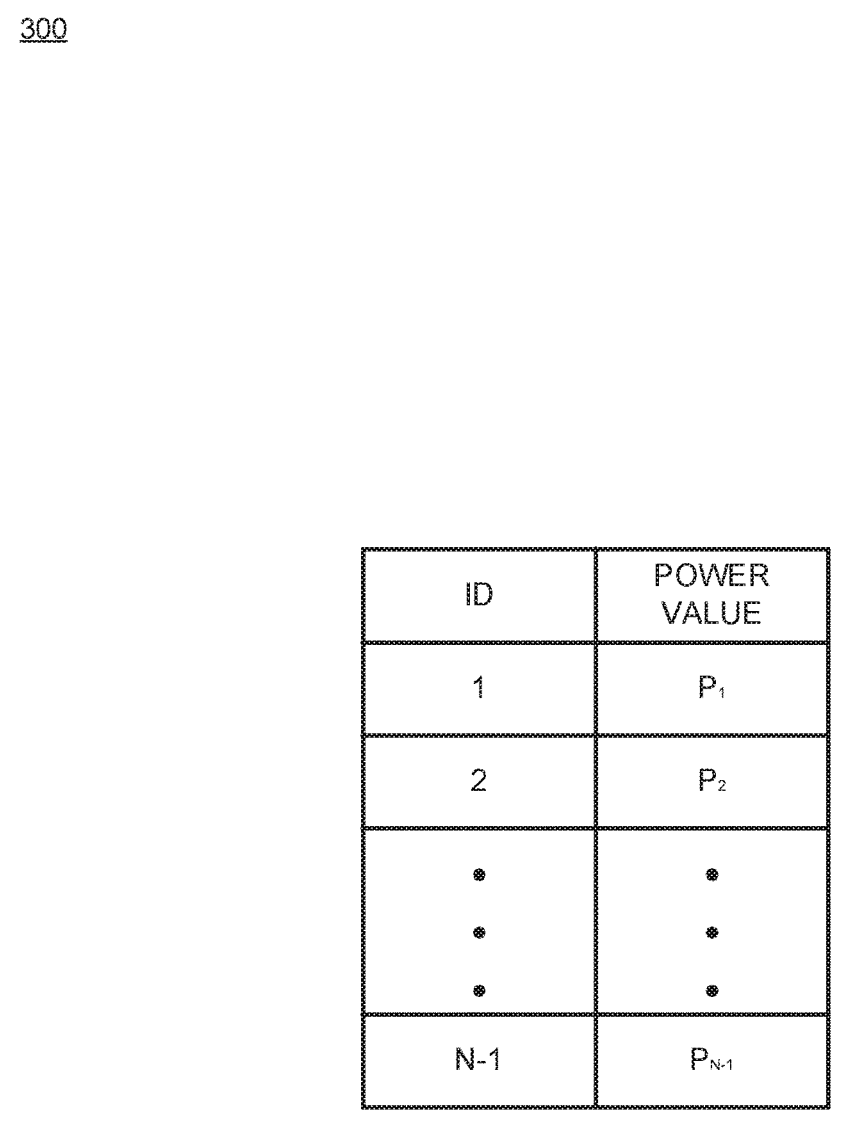

Further communication over the communication link 220 enables each STS 106 to build a relatively synchronized table used to identify a real-time power value supplied to each STS 106 in the system 100. Referring now to FIG. 3, an example resource power table (RPT) 300 is shown. Each STS 106 may generate and maintain the RPT 300 internally, e.g., as a table in the memory 206 or the data storage devices 216. The RPT 300 may be embodied as any table structure (e.g., a database structure, key-value store, etc.) that may store data associated with each STS 106 in the system 100.

For example, illustratively, the RPT 300 may store real-time power values associated with a load supplied to a given STS 106. The RPT 300 may have N−1 rows, in which each row is associated with a given STS 106. For instance, the RPT 300 provides a column for a unit identifier associated with a given STS 106 and a column for a real-time power value being supplied to that STS 106.

In an embodiment, to update and maintain the table, each STS 106 may periodically measure its real-time power supplied by an associated UPS 102 to a downstream power distribution unit (PDU). Also periodically, the STS 106 broadcasts the real-time power value to each other STS 106. For example, to do so, the STS 106 may generate a packet that includes the real-time power value in the payload. The packet payload may also include additional information, such as a unit identifier associated with the STS 106. Of course, identifying information of the STS 106 may also be provided in a header of the packet. Once generated, the STS 106 may transmit, via the communication link 220, the packet to each STS 106. In some embodiments, the packet may be transmit via broadcast techniques in which no particular STS 106 is addressed, but is received by each STS 106. In addition, the STS 106 may also poll other STSs 106 for real-time power values. For example, the STS 106 may do so broadcasting a signal indicating of a request for such values.

In the event that a given STS 106 receives a packet from another STS 106, the STS 106 may evaluate the packet for the real-time power value associated with that other STS 106. More particularly, the STS 106 may evaluate the packet header or payload for identifying information for the STS 106. The STS 106 also evaluates the packet payload to determine the real-time power value. Once determined, the STS 106 may update the RPT 300 with the received value for the corresponding STS 106.

Figure 4:
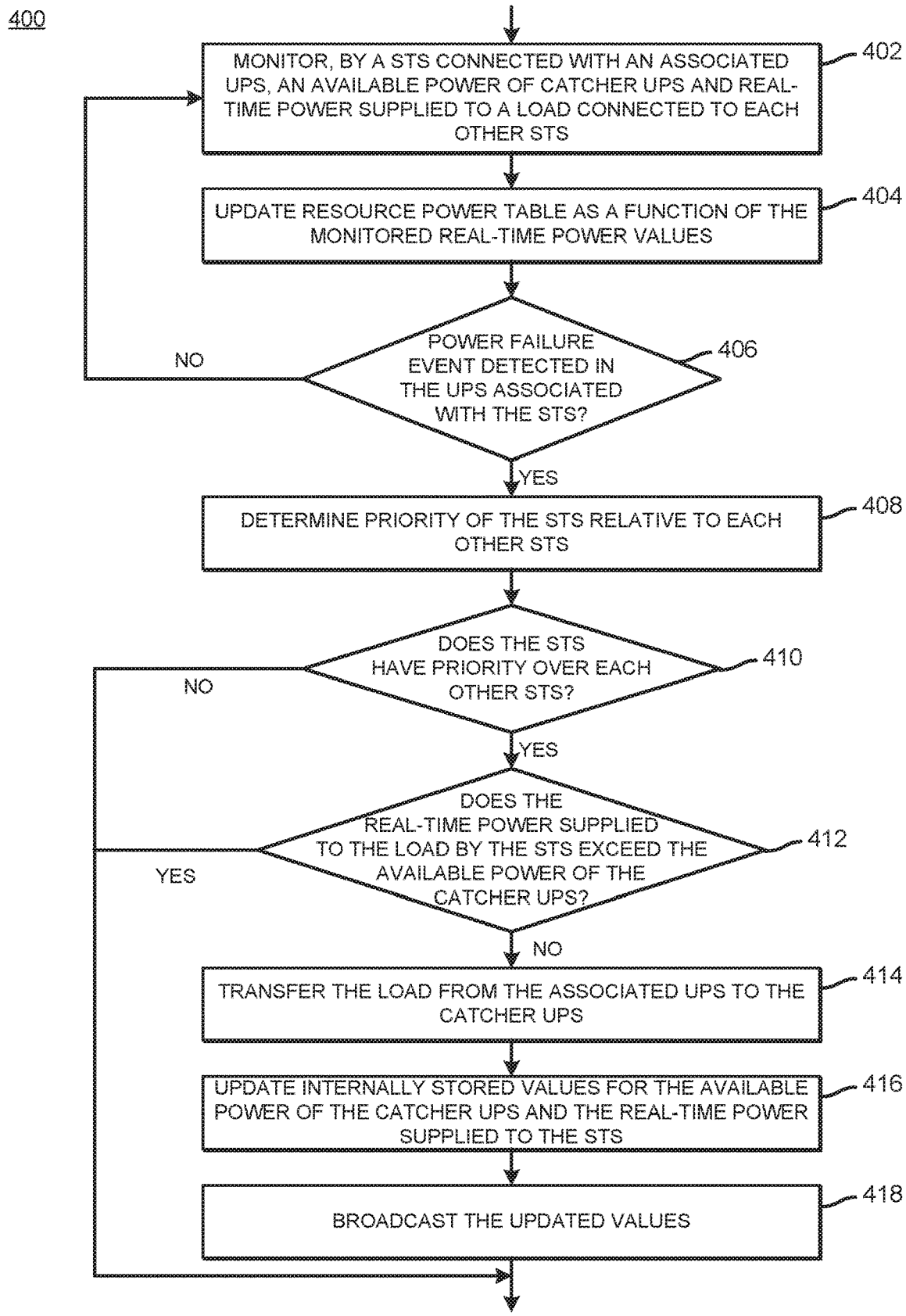
FIG. 4 is a simplified flow diagram of at least one embodiment of a method for transferring a load by one of the STSs of FIG. 1.

Referring now to FIG. 4, each STS 106, in operation, may perform a method 400 for transferring a load from an associated UPS 102 to the catcher UPS 104. As shown, the method 400 begins in block 402, in which the STS 106 monitors an available power of the catcher UPS 104 and a real-time power supplied to a load connected to each other STS 106. As stated, the available power of the catcher UPS 104 may initially be provided as a predefined internal value at start-up of the STS 106. In addition, the internal value may be updated (e.g., following a power failure event) by the STS 106 or in response to a broadcasted updated value from another STS 106. As further stated, the STS 106 may poll each other STS 106 to obtain a real-time power value. In block 404, the STS 106 may update an internal RPT as a function of the monitored real-time power values.

In block 406, the STS 106 may determine whether a power failure event is detected in the UPS 102 associated with the STS 106. Examples of a power failure event include unresponsiveness of a UPS 102 in the event of a source failure, a brown out, excessive voltage, excessive current, and reduced power quality (e.g., a power factor of power is decreased). If a power failure event has not occurred, then the method 400 returns to block 402, in which the STS 106 continues to monitor the available power of the catcher UPS 104 and the real-time power values of each STS 104.

Otherwise, in the event of a power failure event, then in block 408, the STS 106 determines, based in part on the RPT, the priority of the STS 106 relative to each other STS 106. For example, a level of priority may be user-defined or otherwise correlate to whether the STS 106 is the highest power consumer of the STSs 106. The priority determination process is further described relative to FIG. 5.

In block 410, the STS 106 determines whether priority is had over each other STS 106. If not, then the method 400 ends. In such a case, the STS 106 may wait for the STS 106 having higher priority to transfer an associated load to the catcher UPS 104. If the STS 106 has the highest priority, then in block 412, the STS 106 determines whether the real-time power supplied to the load by the STS 106 exceeds the available power of the catcher UPS 104. Doing so ensures that the STS 106 can maximize an amount of load transferred to the catcher UPS 104 without resulting in an overload and potentially to a load drop. To do so, the STS 106 may evaluate a value internal to the STS 106 that is indicative of the available power of the catcher UPS 104.

If the real-time power supplied to the load by the STS 106 exceeds the available power of the catcher UPS 104 (e.g., the catcher UPS 104 has used the available power provided), then the method 400 ends. In such a case, to avoid an overload situation, the STS 106 may wait for an update to the internal value indicative of the available power of the catcher UPS 104, such that the available power is greater or equal to the real-time power of the STS 106.

In block 414, the STS 106 transfers the load from the associated UPS 102 to the catcher UPS 104 via the power line 108. Further, in block 416, the STS 106 updates internal values indicative of the available power of the catcher UPS 104 and the real-time power value supplied to the STS 106. More particularly, the digital signal processor in the STS 106 may subtract the real-time power value from the internal value associated with the available power of the catcher UPS 104. The STS 106 may thereafter reset the real-time power value with a value that indicates to other STSs 106 that the STS 106 is already under power of the catcher UPS 104, which thereby enables other STSs 106 to obtain priority to the available power of catcher UPS 104 and transfer, if needed. For example, a value of −1 (or some other arbitrary values or flags) may be used. In block 418, the STS 106 may broadcast the updated values to each other STS 106 via the communication link 220. To do so, the STS 106 may generate one or more packets for transmission that includes the values in the payload.

Figure 5:
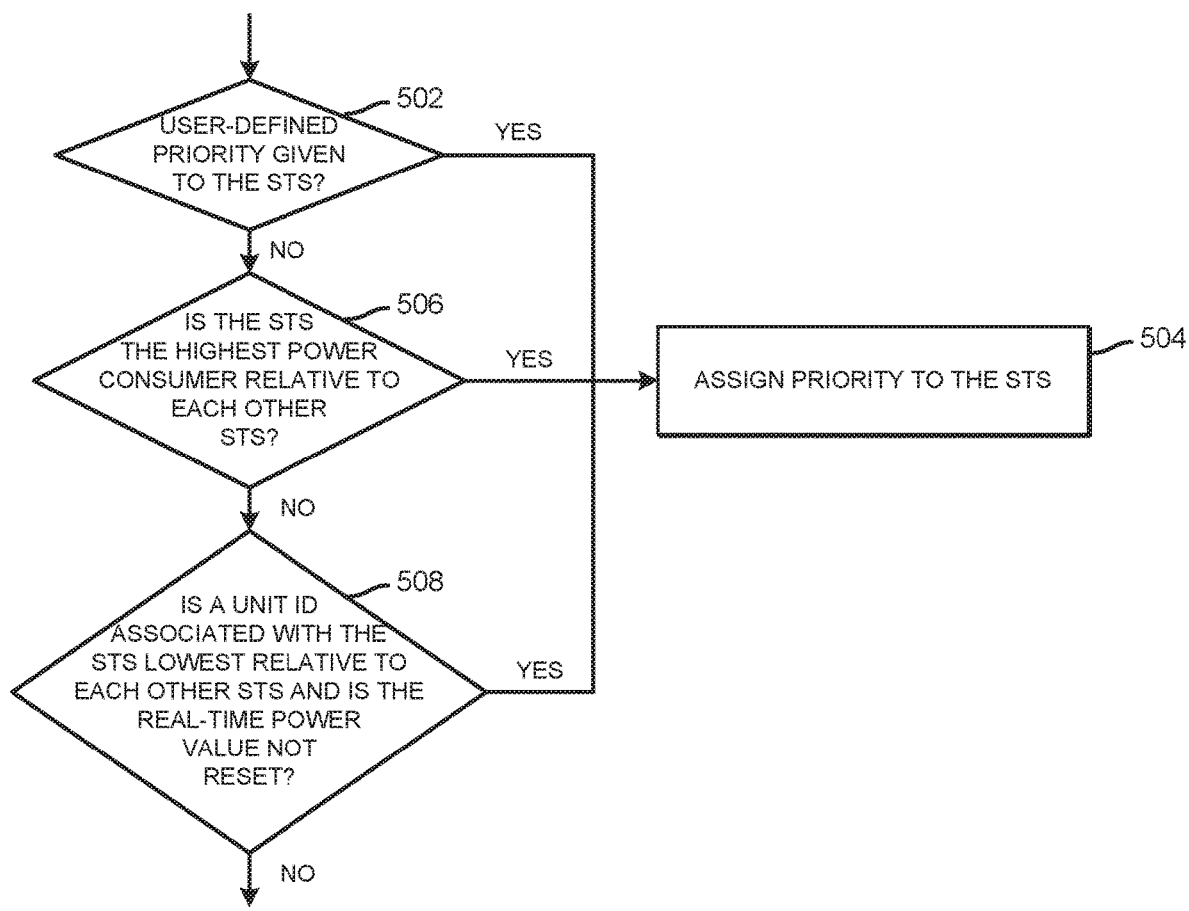
FIG. 5 is a simplified flow diagram of at least one embodiment of a method for determining a priority of an STS relative to each other STS of FIG. 1.

As stated, the STS 106 may determine a priority relative to other STSs 106 during a power failure event. Referring now to FIG. 5, a method 500 is shown for determining such a priority. As shown, the method 500 begins in block 502, in which the STS 106 evaluates an internal configuration to determine whether the STS 106 has user-defined priority. If so, then in block 504, the STS 106 establishes priority over each other STS 106.

Otherwise, in block 506, the STS 106 may then determine whether the STS 106 is the highest power consumer relative to each other STS 106. More particularly, the STS 106 may evaluate the internal RPT table to determine the highest power consumer. For example, assume that the system 100 includes four STSs 106, in which the first three units are consuming 100 KW and the fourth unit is consuming 400 KW. Further, assume that the available power of the catcher UPS 104 is 500 KW. In a power failure event, the fourth unit is the highest power consumer and would establish priority over each other STS 106. In such a case, the method 500 proceeds to block 504.

If the STS 106 is not the highest power consumer relative to each other STS 106, then the STS 106 determines whether a unit identifier associated with the STS 106 is the lowest relative to each other STS 106 and also whether the real-time power value associated with STS 106 is not reset. In some embodiments, a lowest unit identifier may be used to establish priority, e.g., in situations in which more than one STS 106 are the highest power consumers in the system 100. For example, in a situation in which more than one STS 106 is a highest power consumer, the STS 106 may evaluate the RPT to determine the unit identifier of the other highest power consumer(s) and evaluate the identifier. If the present STS 106 has the lowest unit identifier value, then the method 500 proceeds to block 504. Of course, other embodiments may include determining priority relative to other characteristics of a given STS 106, such as assigning priority based on a highest unit identifier value.

The invention claimed is:

1. A system comprising:
   a plurality of uninterruptible power supplies (UPSs);
   a catcher uninterruptible power supply (UPS); and
   a plurality of static transfer switches (STSs), each static transfer switch of the plurality of STSs connected to enable receiving power from an associated one of the plurality of UPSs and from the catcher UPS, each of the plurality of STSs comprising a control unit to:
   monitor an available power of the catcher UPS;
   receive a real-time power value from each other STS of the plurality of STSs, wherein the respective real-time power values represent a real-time power supplied by the corresponding STS to a respective connected load;
   determine, in response to a power failure event of the associated UPS, (i) whether a real-time power supplied to a load connected to the respective STS exceeds the available power of the catcher UPS, and (ii) whether the respective STS has priority over each other STS of the plurality of STSs based on the real-time power supplied to the load of the respective STS and the real-time power values received from each other STS of the plurality of STSs; and
   control the respective STS to transfer the load from the associated UPS to the catcher UPS in response to determining that (i) the real-time power supplied to the load does not exceed the available power of the catcher UPS, and (ii) the respective STS has priority over each other STS of the plurality of STSs.

2. The system of claim 1, wherein to determine whether the STS has priority over each other STS of the plurality of STSs comprises determining that the real-time power supplied to the load by the respective STS exceeds each of the real-time power values received from each other STS of the plurality of STSs.

3. The system of claim 1, wherein each of the plurality of STSs further comprises a communication link to connect with each other STS of the plurality of STSs.

4. The system of claim 3, wherein to receive the real-time power value from each other STS of the plurality of STSs comprises to:
   poll, via the communication link, each other STS of the plurality of STSs for the respective real-time power value; and build a table to store the real-time power value of each other STS of the plurality of STSs obtained in response to the poll.

5. The system of claim 3, wherein the control unit of each of the plurality of STSs is further configured to broadcast, via the communication link, the real-time power value of the respective STS to each STS of the plurality of STSs.

6. The system of claim 5, wherein the control unit of each of the plurality of STSs is further configured to:
determine an updated value representing the available power of the catcher UPS following the transfer of the load to the catcher UPS; and
broadcast the updated value to each STS of the plurality of STSs.

7. The system of claim 1, wherein to determine whether the respective STS has priority is based on a determination of whether the priority is defined in a configuration for the plurality of STSs.

8. The system of claim 1, wherein each STS of the plurality of STSs further comprises a unit identifier.

9. The system of claim 8, wherein to determine whether the respective STS has priority over each other STS of the plurality of STSs comprises determining whether the respective STS has priority over each other STS of the plurality of STSs based on, at least in part, the unit identifier of each STS of the plurality of STSs.

10. A method comprising:
monitoring, via a control unit of a static transfer switch (STS) of a plurality of STSs, an available power of a catcher uninterruptible power supply (UPS), wherein each STS is connected to enable receiving power from an associated one of a plurality of UPSs and from the catcher UPS;
receiving a real-time power value from each other STS of the plurality of STSs, wherein the respective real-time power values represent a real-time power supplied by the corresponding STS to a respective connected load;
determining, in response to a power failure event of the associated UPS, (i) whether a real-time power supplied to a load connected to the STS exceeds the available power of the catcher UPS, and (ii) whether the STS has priority over each other STS of the plurality of STSs based on the real-time power supplied to the load of the STS and the real-time power values received from each other STS of the plurality of STSs; and
controlling the STS to transfer the load from the associated UPS to the catcher UPS in response to determining that (i) the real-time power supplied to the load does not exceed the available power of the catcher UPS, and (ii) the STS has priority over each other STS of the plurality of STSs.

11. The method of claim 10, wherein determining whether the STS has priority over each other STS of the plurality of STSs comprises determining that the real-time power supplied to the load by the STS exceeds each of the real-time power values received from each other STS of the plurality of STSs.

12. The method of claim 10, wherein each of the plurality of STSs further comprises a communication link to connect with each other STS of the plurality of STSs.

13. The method of claim 12, wherein receiving the real-time power value from each other STS of the plurality of STSs comprises:
polling, via the communication link, each other STS of the plurality of STSs for the respective real-time power value; and
building a table to store the real-time power value of each other STS of the plurality of STSs obtained in response to the poll.

14. The method of claim 12, further comprising broadcasting, via the communication link, the real-time power value of the STS to each STS of the plurality of STSs.

15. The method of claim 14, further comprising:
determining an updated value representing the available power of the catcher UPS following the transfer of the load to the catcher UPS; and
broadcasting the updated value to each STS of the plurality of STSs.

16. The method of claim 10, wherein determining whether the STS has priority is based on determining whether the priority is defined in a configuration for the plurality of STSs.

17. The method of claim 10, wherein each STS of the plurality of STSs further comprises a unit identifier.

18. The method of claim 17, wherein determining whether the STS has priority over each other STS of the plurality of STSs comprises determining whether the STS has priority over each other STS of the plurality of STSs based on, at least in part, the unit identifier of each STS of the plurality of STSs.

* * * * *